United States Patent
Trahan et al.

[11] Patent Number: 5,332,413
[45] Date of Patent: Jul. 26, 1994

[54] PLUNGER MECHANISM FOR AN I.S. MACHINE

[75] Inventors: Albert J. Trahan, Vernon Court; Vaughan Abbott, East Hartland; Michael J. Stankosky, Windsor, all of Conn.

[73] Assignee: Emhart Glass Machinery Investments Inc., Wilmington, Del.

[21] Appl. No.: 24,887

[22] Filed: Mar. 1, 1993

Related U.S. Application Data

[63] Continuation of Ser. No. 824,741, Jan. 21, 1992, abandoned, which is a continuation of Ser. No. 619,051, Nov. 28, 1990, abandoned.

[51] Int. Cl.⁵ ............... C03B 9/38; C03B 11/12
[52] U.S. Cl. ....................... 65/319; 65/356
[58] Field of Search ............ 65/319, 356, 83, 111, 65/172, 173, 362, 322, 323, 267, 268, 348

[56] References Cited

U.S. PATENT DOCUMENTS 2,702,444  2/1955  Rowe .................... 65/323
4,272,273  6/1981  Trahan ................... 65/319

Primary Examiner—Joye L. Woodard
Attorney, Agent, or Firm—Spencer T. Smith

[57] ABSTRACT

Vented plunger cooling exhaust air is directed downwardly through the lower cylinder through suspended tubing to isolate the hot exhaust air from the lower cylinder.

7 Claims, 3 Drawing Sheets

PLUNGER MECHANISM FOR AN I.S. MACHINE

This application is a continuation of U.S. patent application Ser. No. 07/824,741 filed Jan. 21, 1992, now abandoned which is a continuation of U.S. patent application Ser. No. 07/619,051 filed Nov. 28, 1990, now abandoned.

The present invention relates to individual section machines which receive a gob of molten glass and form it into a glass container such as a bottle.

When bottles are formed by the press and blow process the molten gob is first formed into a parison on the blank side of the machine by forcing a plunger, which is a part of a plunger mechanism, into the molten gob. The formed parison is transferred to the finish side of the machine where it will be blown into the finished bottle.

The plunger must be effectively cooled if it is to operate properly and this is done by supplying cooling air to the interior of the plunger and then exhausting this air through the lower cylinder portion of the plunger mechanism.

Heat transfer through the lower cylinder portion in a multi-gob section has long been a problem since heat transfer is not uniform. As a result, designs have been proposed to vent the exhausted cooling air above the lower cylinder portion into the section box which supports the plunger mechanism but this tends to elevate the temperature of the cooling air and allows dirt to enter the plunger positioner which has undesirable consequences.

It is accordingly an object of the present invention to establish a uniform temperature throughout the housing while venting cooling air therethrough.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

Figure 1:
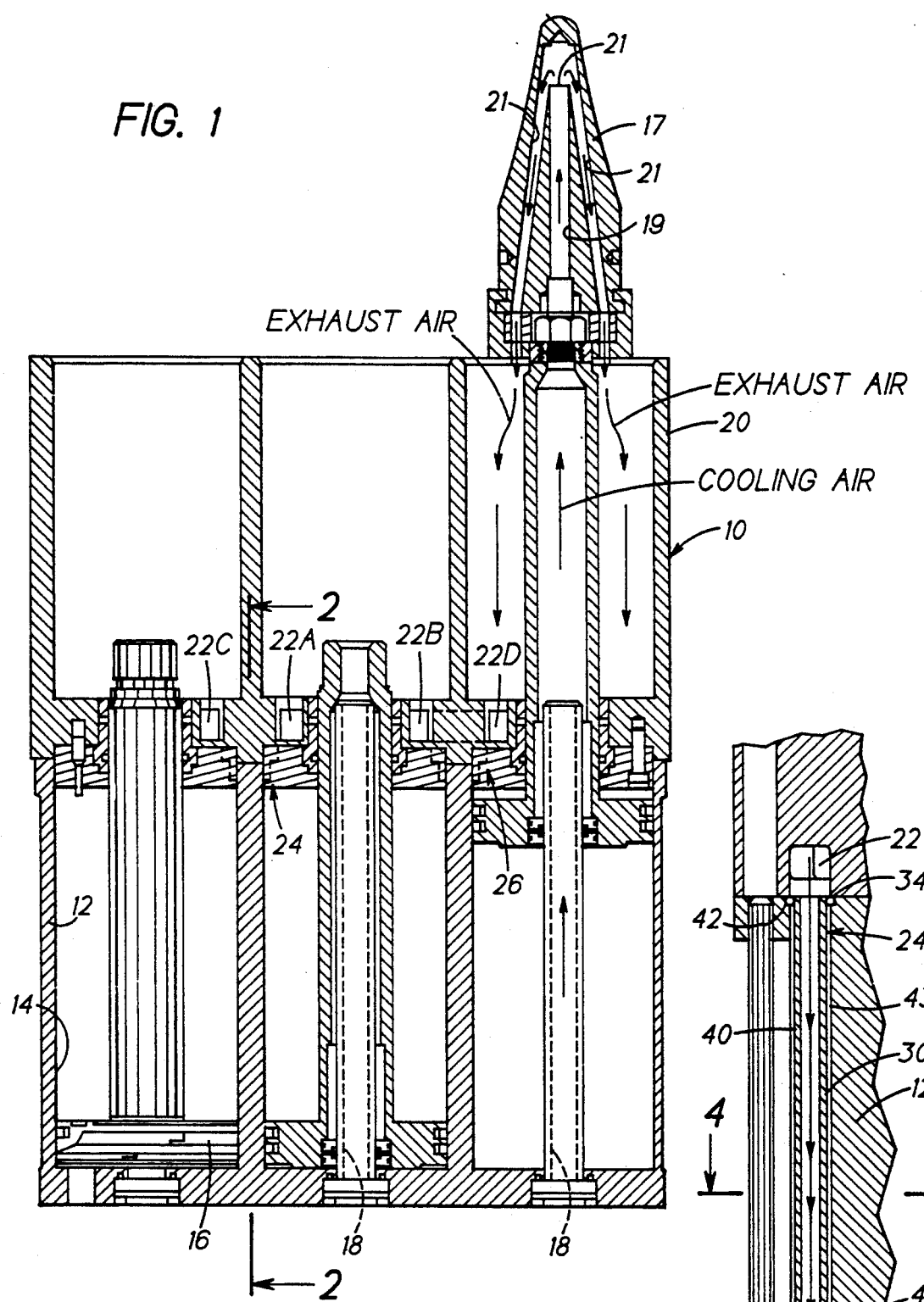
FIG. 1 is an elevational cross-sectional view of a triple gob plunger mechanism.
Figure 2:
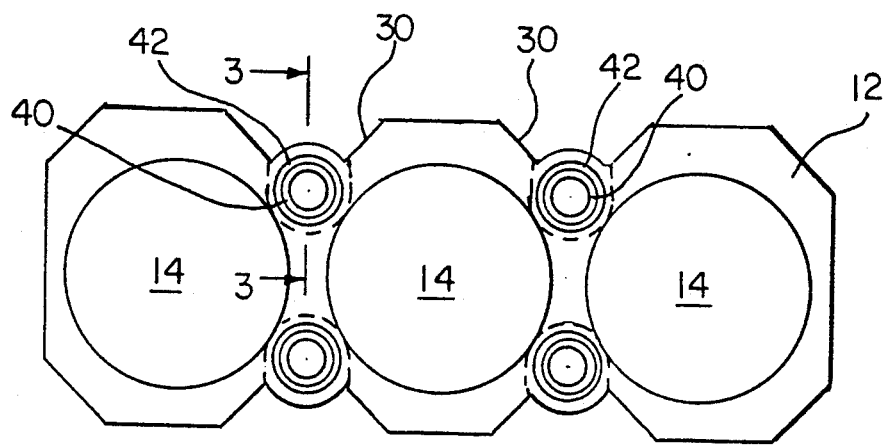
FIG. 2 is a top view of the lower cylinder housing of the plunger mechanism shown in FIG. 2.
Figure 4:
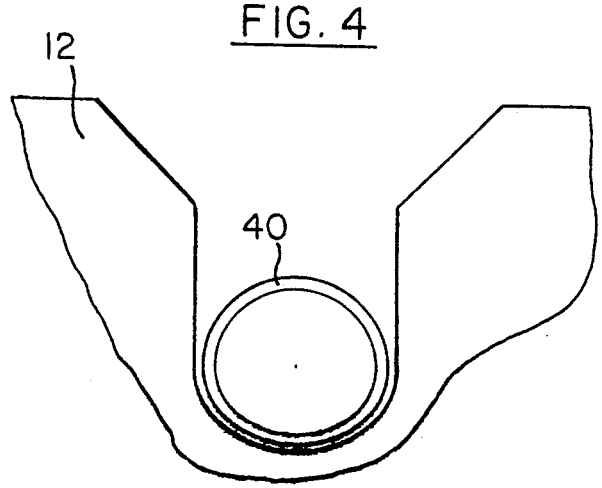
FIG. 4 is a cross-sectional view of an edge portion of the plunger mechanism taken along line 4—4 of FIG. 3.
Figure 5:
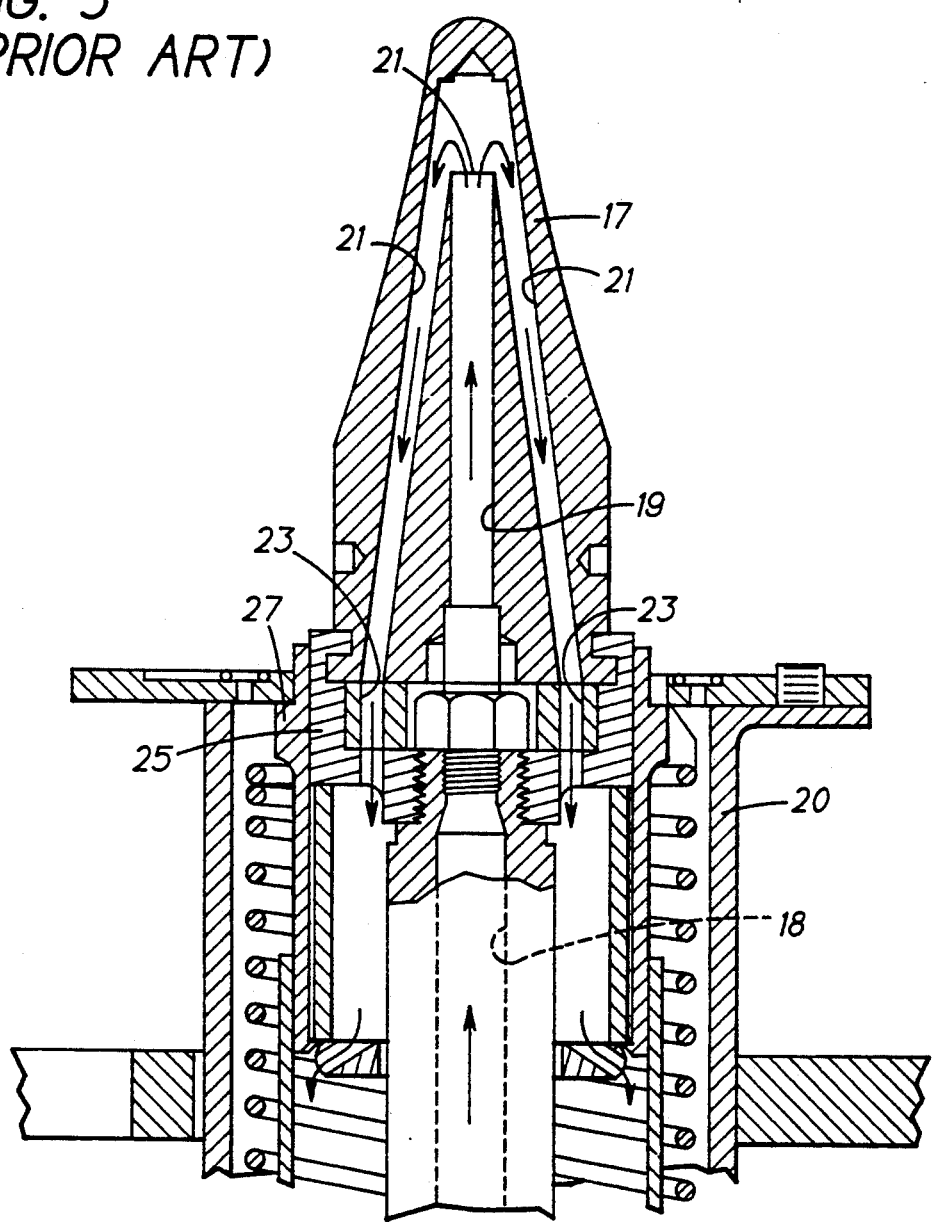
FIG. 5 is a cross sectional view of the top of one of the casing cylinders showing a plunger secured to the top of the piston.

An individual section glass container forming machine includes a plurality of sections each having a blank side and a finish side. The forming machine operates in an air environment and accordingly, these sections are surrounded by air. The blank side 10 in a multi-gob press and blow process will include a lower cylinder portion 12 having a plurality of chambers 14 in which pistons 16 having integral rods 16R are displaceable to selectively elevate conventional gob engaging plungers 17, such as those shown in U.S. Pat. No. 2,508,890, which are secured to the top of the pistons. The central axis of these plungers as seen from FIG. 2 lie in a common vertical plane. As can be seen from FIGS. 1 and 5, cooling air is supplied to the plungers via conduits 18 within the piston and integral rod, which supply cooling tubes 19 located within each plunger 17. Cooling air flows through this passage, leaves the plunger through apertures 21 and flows downwardly through exit conduits 23 in the adapter portion 25 of the plunger into the upper casing cylinder 20 where it flows downwardly. This air is contained within the upper cylinder and flows downwardly, as shown by the arrows, and passes through suitable exit ports 22. Details of a state of the art upper cylinder, vis-a-vis the flow of cooling air, is shown in U.S. Pat. Nos. 4,659,357 and 4,836,842. The plunger's vertical displacement is guided by a centering sleeve 27. Additional details are illustrated in U.S. Pat. No. 508,890 and 4,272,273. As shown in FIG. 1, the exhaust air from the central plunger is exhausted through a pair of exit ports 22A, 22B whereas the exhaust air from the side plungers is exhausted through a single exit port 22C, 22D. Further details of the plunger mechanism are disclosed in U.S. Pat. No. 4,272,273 and 4,838,921.

Figure 3:
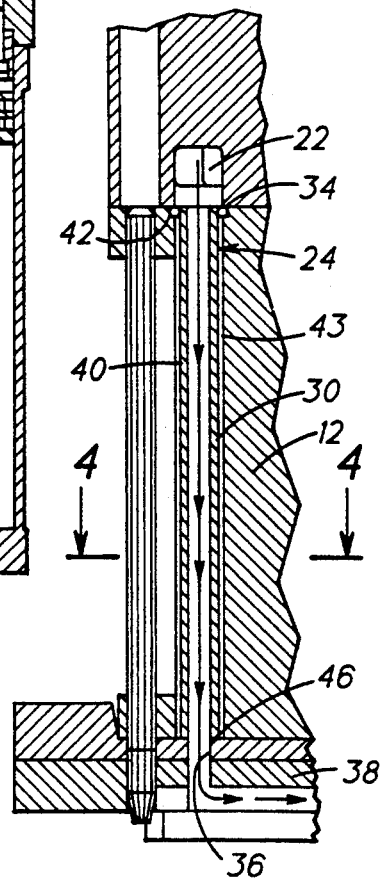
FIG. 3 is a view taken at 2—2 of FIG. 1.

Exit ports 22A and 22C communicate with a pair of exhaust conduits 24 symmetrically located at the upper end of the lower cylinder between the left two chambers 14 while exit ports 22B and 22D communicate with a pair of exhaust conduits 26 symmetrically located at the upper end of the lower cylinder between the right two chambers 14. Each of these exhaust ports 24 and 26 has a recessed upper end 34. At the lower end of the lower cylinder portion 12 directly below exhaust ports 24 and 26 are bores 36 as shown in FIG. 3. Between the exhaust ports 24 and 26 at the upper end and bores 36 at the lower end, the side wall of the lower cylinder portion 12 is machined to machine surface 30, which has a semi-cylindrical portion 30A and continues with parallel walls 30B which intersect the outer surface 30C of the lower cylinder, thereby establishing communication with atmospheric air. Each channel is equidistant from its associated pair of chambers. A sleeve member 40 has a collar portion 42 which is supported within the recess 34 and has a thickness selected so that it will be effectively clamped between the upper casing and the lower cylinder portion thereby assuring that exhaust air will flow into and through the sleeve 40. The outer diameter of the sleeve is chosen to be smaller than the inner diameter of surface 30, which is in the form of a vertical channel, thereby creating an annular air space 43 on one half of the sleeve 40 and an open area to the atmosphere on the other half of the sleeve 40 thereby insulating the lower cylinder from the hot sleeves. As can be seen from FIG. 2 a sleeve is located on either side of the central plane between each pair of cylinders. The lower end 46 of the sleeve 40 is wedgedly fitted into the bores 36 which permits the transfer of hot exhaust air to the exit port 38 of the base plate.

We claim:

1. A plunger mechanism for an individual section glass container forming machine comprising
an upper cylinder portion having a plurality of cylindrical chambers,
a lower cylinder portion supporting said upper cylinder portion and having a corresponding plurality of cylindrical chambers with a selectively displaceable cylindrical piston disposed therein, each piston having a rod portion displaceable within a corresponding one of said upper cylinder chambers,
said pistons each including an axially extending cooling air conduit,
a base plate for supporting said lower cylinder portion, said base plate having an exhaust air passage, said upper cylinder portion including exhaust air exit ports at the bottom thereof for venting exhaust air from said upper cylinder portion and at least one tubular sleeve extending vertically from the top of said lower cylinder portion to said base plate for receiving exhaust air vented from said exhaust air exit ports and for conveying the received exhaust air to said base plate exhaust air passage, said tubular sleeve being spaced from said lower cylinder portion substantially from the top of said lower cylinder portion to the bottom thereof and said spacing communicating with the air surrounding said lower cylinder portion whereby the air surrounding the lower cylinder portion will insulate each of said tubular sleeves from said lower cylinder portion.

2. A plunger mechanism according to claim 1 wherein there are three chambers and four of said tubular sleeves.

3. A plunger mechanism according to claim 1, wherein said lower cylinder portion comprises a housing having said plurality of cylindrical chambers defined therein.

4. A plunger mechanism according to claim 1, wherein there are a plurality of tubular sleeves and each of said tubular sleeves is associated with a single one of said exhaust air exit ports.

5. A plunger mechanism according to claim 4 wherein one end of each of said tubular sleeves is in mating engagement with said upper cylinder portion.

6. A plunger mechanism according to claim 1, wherein said upper cylinder portion comprises a unitary housing.

7. A plunger mechanism according to claim 1, further comprising a plunger assembly secured to the rod portion of each of said pistons including a cooling air passage for receiving cooling air from said piston cooling air conduit and at least one air exhaust conduit for exhausting cooling air discharged from said air passage into a corresponding one of said upper cylinder portion chambers.

* * * * *